(12) United States Patent
Oishi et al.

(10) Patent No.: US 8,374,066 B2
(45) Date of Patent: Feb. 12, 2013

(54) OPTICAL PICKUP

(75) Inventors: Kotaro Oishi, Fujisawa (JP); Toshiteru Nakamura, Yokohama (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 3 days.

(21) Appl. No.: 13/088,454

(22) Filed: Apr. 18, 2011

(65) Prior Publication Data

US 2011/0310722 A1    Dec. 22, 2011

(30) Foreign Application Priority Data

Jun. 18, 2010   (JP) ................................. 2010-139171

(51) Int. Cl.
  *G11B 7/00*  (2006.01)
(52) U.S. Cl. ........... 369/44.41; 369/110.03; 369/112.06; 369/120; 369/124.01; 369/124.12
(58) Field of Classification Search .................. None
  See application file for complete search history.

(56) References Cited

U.S. PATENT DOCUMENTS

| | | | |
|---|---|---|---|
| 5,084,850 A * | 1/1992 | Yanagawa et al. | 369/44.41 |
| 7,130,259 B2 | 10/2006 | Takasuka et al. | |
| 7,339,655 B2 * | 3/2008 | Nakamura et al. | 356/5.1 |
| 2003/0202450 A1 | 10/2003 | Takasuka et al. | |
| 2006/0087953 A1 * | 4/2006 | Tohyama et al. | 369/126 |
| 2011/0170397 A1 * | 7/2011 | Sato et al. | 369/112.16 |

FOREIGN PATENT DOCUMENTS

JP    2003-317280    11/2003

* cited by examiner

*Primary Examiner* — Wayne Young
*Assistant Examiner* — Dionne Pendleton
(74) *Attorney, Agent, or Firm* — Antonelli, Terry, Stout & Kraus, LLP.

(57) ABSTRACT

An optical pickup having a one-plane, two-wavelength diffraction grating and a two-wavelength laser generator is provided in which crosstalk noise caused by leakage of a track error signal into a focus error signal is reduced to improve focus control performance. A main beam and sub-beams generated by the one-plane, two-wavelength diffraction grating and reflected from the surface of an optical disc are incident on corresponding light receiving elements among which the one to receive the main beam and those to receive the sub-beams are relatively shifted in a linear-speed direction of the optical disc. The distance of the shifting is determined based on the characteristic, relative to the relative positions of the light receiving elements, of the leakage of the tracking error signal into the focus error signal detected based on the main beam and sub-beams.

3 Claims, 5 Drawing Sheets

(1) Main-XTK
(2) Sub-XTK
(3) DAD-XTK (1) Main-XTK
(2) Sub-XTK
(3) DAD-XTK (1) Main-XTK
(2) Sub-XTK
(3) DAD-XTK

23A

Sub   23

22A

Main   22

21A

Sub   21

CD SECTION    DVD SECTION

OPTICAL PICKUP

INCORPORATION BY REFERENCE

This application relates to and claims priority from Japanese Patent Application No. 2010-139171 filed on Jun. 18, 2010, the entire disclosure of which is incorporated herein by reference.

BACKGROUND OF THE INVENTION (1) Field of the Invention

The present invention relates to an optical pickup and, more particularly, to an optical pickup with reduced leakage of a tracking error signal into a focus error signal.

(2) Description of the Related Art

Among the optical disc devices for recording and reproducing an information signal on and from an optical disc such as a compact disc (CD) or a digital versatile disc (DVD), those for using a DVD as a recoding medium, in particular, are required to be compatible also with a CD as a recording medium. Such optical disc devices require an optical pickup which can selectively generate, according to the type of the recording medium loaded, a near-infrared laser beam for CD or a red laser beam for DVD, which differ in wavelength, to record or reproduce an information signal on or from the recording medium.

An example of a two-wavelength optical pickup which can generate laser beams of two different wavelengths as described above is disclosed in Japanese Patent Application Laid-Open No. 2003-317280.

SUMMARY OF THE INVENTION

The two-wavelength optical pickup like the one described above used to include, as shown in FIG. 3 of Japanese Patent Application Laid-Open No. 2003-317280, a pair of laser source and diffraction grating for CD, another pair of laser source and diffraction grating for DVD, and a beam splitter for guiding the two laser beams emitted from the two laser sources into an approximately same optical path, imposing a limitation on its miniaturization.

In two-wavelength optical pickups widely used today, however, a two-wavelength laser source unit includes two laser diodes, arranged closely to each other (spaced apart, for example, by about 0.1 mm), for generating two laser beams of different wavelengths, one for CD and the other for DVD, and a same diffraction grating is used for the two laser beams making the above mentioned beam splitter unnecessary, so that miniaturization of the optical pickups can be better promoted.

Using, as described above, a diffraction grating for both CD and DVD will be discussed below. A diffraction grating has a predetermined grating period and divides a laser beam generated by a laser source into a main beam (zeroth-order diffracted beam) and two sub-beams (positive and negative first-order diffracted beams). As being described later, an optical pickup has a light receiving element in a photodetector for detecting a main beam reflected from a disc surface and two light receiving elements in the photodetector for detecting two sub-beams also reflected from the disc surface. In the optical disc device, a tracking error signal for tracking control and a focus error signal for focus control are generated by computation using electrical signals obtained from the light receiving elements in the photodetector and the optical pickup position is controlled, using the tracking error signal and focus error signal, in the horizontal (tracking) direction and vertical (focus) direction relative to the recording track on the optical disc.

Between a CD and a DVD, not only the wavelength of the laser beam to be used but also the track pitch differs, so that the optimum grating period of the diffraction grating also differs between a CD and a DVD. Generally, therefore, two diffraction gratings, one for CD and the other for DVD, are provided at different positions along the thickness direction (laser beam traveling direction). A set of such diffraction gratings is sometimes referred to as a two-plane, two-wavelength diffraction grating. A problem with a two-plane, two-wavelength diffraction grating having two diffraction grating planes is a high cost.

Recently, to remove such a cost problem, one-plane, two-wavelength diffraction gratings each having only one diffraction plane have come to be used. When using a same diffraction plane for two laser beams of different wavelengths, an optimum grating period is determined for a position through which the two beams pass. In reality, however, determining an optimum grating period for the two beams is difficult, so that a grating period which, though not optimum, is applicable to the two beams without causing any significant problem is used.

In such a case, the two sub-beams, in particular, result in being incident on spots on the surface of an optical disc slightly shifted from optimum spots, respectively. This causes a tracking error signal to leak into a focus error signal used for focus control and thereby degrades the focus control performed for the optical pickup.

The present invention has been made in view of the above problem and it is an object of the invention to provide an optical pickup with reduced leakage of a tracking error signal into a focus error signal.

To address the above problem, the present invention provides an optical pickup for recording or reproducing, by irradiating an optical disc recording medium with a laser beam, an information signal on or from the optical disc recording medium. The optical pickup comprises: a laser beam generator for selectively generating a first laser beam with a first wavelength or a second laser beam with a second wavelength different from the first wavelength; a one-plane two-wavelength diffraction grating which is irradiated with one of the first and the second laser beams generated by the laser beam generator and divides, using a same diffraction plane, the one of the first and the second laser beams into a main beam and two sub-beams; a collimating lens for converting the main beam and two sub-beams, each being a divergent beam, generated at the one-plane two-wavelength diffraction grating into parallel beams;

an objective lens for condensing the main beam and two sub-beams converted into parallel beams by the collimating lens on a data recording surface of the recording medium; a condensing lens for condensing the main beam and two sub-beams reflected from the data recording surface; and a photodetector including a first light receiving element which has four light receiving areas and converts, by being irradiated with the main beam condensed by the condensing lens, the main beam into an electrical signal and a second and a third light receiving elements each of which has four light receiving areas and converts, by being irradiated with a corresponding one of the two sub-beams condensed by the condensing lens, the corresponding sub-beam into an electrical signal. In the optical pickup, a center position of the four light receiving areas of each of the second and the third light receiving elements is shifted, in a linear-speed direction of the optical disc relative to the optical pickup, by a predetermined distance relative to the first light receiving element.

According to the present invention, an optical pickup with reduced leakage of a tracking error signal into a focus error signal can be provided, so that the invention can contribute toward improving the basic performance of optical pickups.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE EMBODIMENT

An embodiment of the present invention will be described below with reference to the accompanying drawings.

Figure 1:
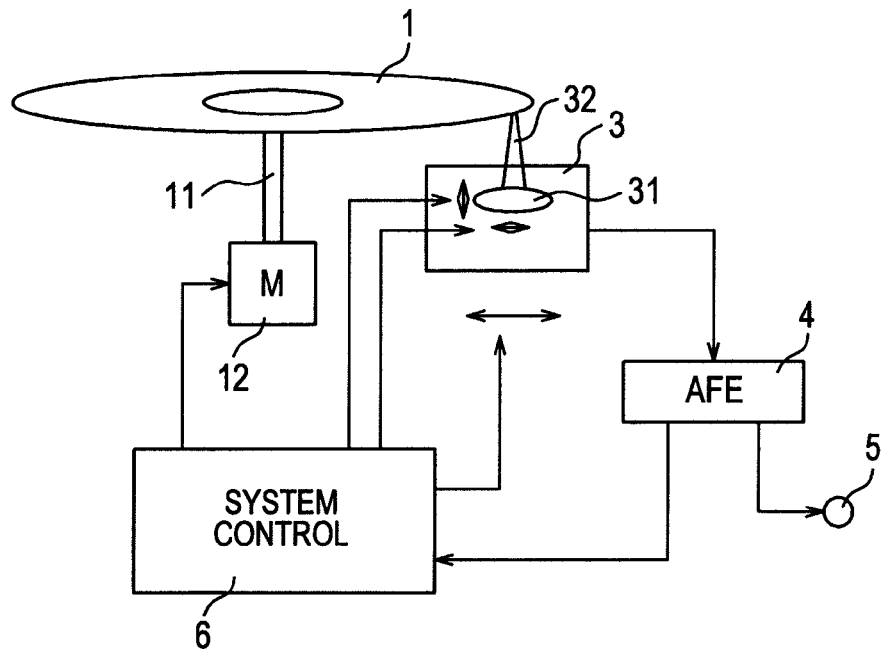
FIG. 1 is a block diagram of an optical disc device including an optical pickup according to an embodiment of the present invention.

FIG. 1 is a block diagram of an optical disc device including an optical pickup according to an embodiment of the present invention. An optical disc 1 is a recording medium such as a CD or a DVD. It may also be a write-once disc, e.g. a CD-R or DVD-R, which allows recording only once, or a rewritable disc, e.g. a CD-RW or DVD-RAM, or a read-only disc, e.g. a CD-ROM or DVD-ROM. When the optical disc 1 is loaded in the optical disc device, it is rotationally driven by a spindle motor 12 via a shaft 11 in accordance with a drive control signal provided by a system control circuit 6.

An optical pickup 3 irradiates the recording surface of the optical disc 1 with a laser beam 32 via an objective lens 31 to record or reproduce data on or from the optical disc 1.

The optical pickup 3 is included in a thread mechanism (not shown) and, moving over the optical disc 1 along the radial direction thereof, records or reproduces data on or from a predetermined track position on the optical disc 1 in accordance with a control signal generated by the system control circuit 6. The objective lens 31 is included in an actuator (not shown) and its position is fine-adjusted, also in accordance with a control signal generated by the system control circuit 6, both in the vertical direction (focusing direction) and radial direction (tracking direction) relative to the optical disc 1 so as to allow the laser beam 32 to trace, in a correctly focused state, a predetermined recording track.

When the optical pickup 3 reproduces a signal from the optical disc 1, the reproduced signal is supplied to an analog front end (AFE) circuit 4. The AFE circuit 4 processes the reproduced signal that is, even though digitally recorded, to be intrinsically treated as an analog signal. Namely, the AFE CIRCUIT 4 generates, by processing the reproduced signal, a tracking error (TE) signal and a focus error (FE) signal and supplies the generated signals to the system control circuit 6. The system control circuit 6 generates, based on the TE signal and FE signal supplied, servo signals for tracking and focusing and supplies the servo signals to the optical pickup 3 thereby controlling the operation of the optical pickup 3.

When data is recorded or reproduced using the optical pickup 3 and optical disc 1, the AFE circuit 4 equalizes the frequency characteristics of data signal amplitude and phase, then outputs the data to an output terminal 5 allowing the data to be supplied to a reproduced signal processing circuit (not shown). There are cases in which the AFE circuit 4 as well as the reproduced signal processing circuit is integrated on a same semiconductor chip on which the system control circuit 6 is also integrated.

The optical pickup 3 shown in FIG. 1 will be described below.

Figure 2:
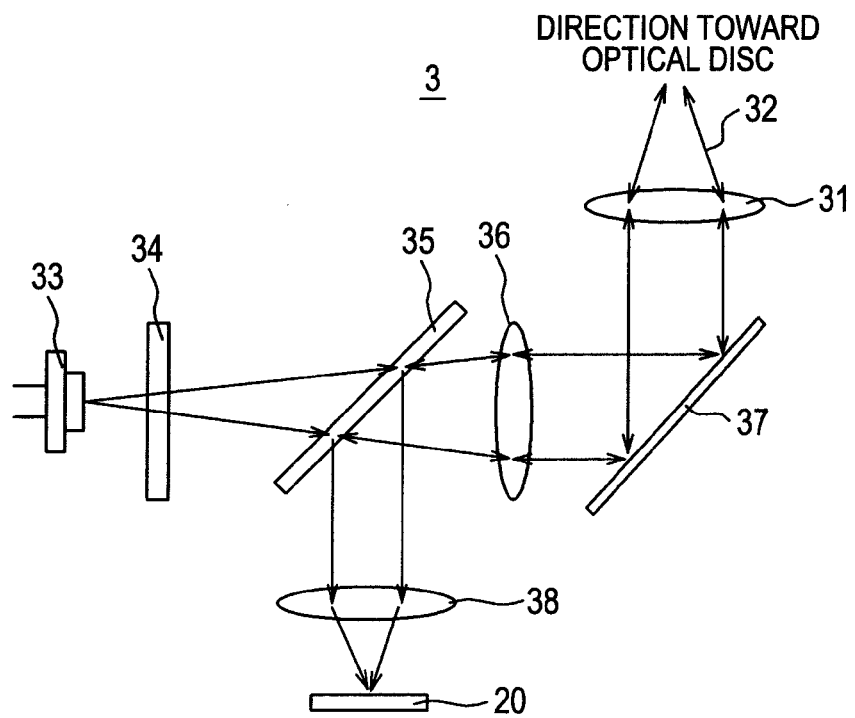
FIG. 2 is a block diagram of the optical pickup shown in FIG. 1.

FIG. 2 is a block diagram of the optical pickup 3 shown in FIG. 1. The optical pickup 3 includes a two-wavelength laser beam generator 33 for generating laser beams for CD and DVD. The laser beam generator 33 includes laser diodes and generates, depending on the type of the optical disc 1 loaded in the optical disc device, a near-infrared laser beam for CD or a red laser beam for DVD. In FIG. 2, the arrows indicate an approximate optical path followed by the generated laser beams.

As mentioned in the foregoing, the laser sources for CD and DVD are arranged closely to each other. In reality, they are shifted from each other by about 0.1 mm. Because the recording track pitch differs between a CD and a DVD and also because the distance between the laser source for CD and the CD surface differs from the distance between the laser source for DVD and the DVD surface, the optical path followed by the laser beam for CD slightly differs from the optical path followed by the laser beam for DVD. In FIG. 2, however, they are shown as being identical for simplification.

When a laser beam is generated by the laser beam generator 33, it is divided, at a diffraction grating 34, into three beams, i.e. one main beam called a zeroth-order diffracted beam and two sub-beams called positive and negative first-order diffracted beams. The diffraction grating 34 divides the laser beam such that the two sub-beams hit two spots on the optical disc 1 which are mutually oppositely shifted, in the radial direction of the optical disc 1, from the spot hit by the main beam by one half the recording track pitch of the optical disc 1.

The three beams thus generated at the diffraction grating 34 pass, each as a divergent beam, a beam splitter 35 to be then each converted into a parallel beam at a collimating lens 36. Subsequently, the parallel beams are reflected from a total reflection mirror 37 toward the recording surface of the optical disc 1. The reflected beams irradiate the optical disc 1 after being refracted by the objective lens 31 to be focused on the recording surface of the optical disc 1. As mentioned in the foregoing, the objective lens 31 is included in an actuator, and its position is controlled in both the tracking direction and the focusing direction so that it can accurately trace the recording track of the optical disc 1.

The three beams reflected from the optical disc 1 reach, via the objective lens 31, the total reflection mirror 37 to be reflected toward the collimating lens 36. After passing the collimating lens 36, the beams are reflected by the beam splitter 35 to reach a condensing lens 38. The beams are refracted by the condensing lens 38 and are emitted to a photodetector 20 to be converted into electrical signals corresponding to their intensities. The AFE circuit is supplied with the electrical signals, equalizes, based on the supplied electrical signals, the frequency characteristics of the data signal reproduced from the optical disc 1 and generates the TE and FE signals.

Note that the optical pickup structure shown in FIG. 2 does not limit the present invention. For example, the beam splitter 35 and the collimating lens 36 may be arranged in reverse order as in the arrangement described in Japanese Patent Application Laid-Open No. 2003-317280. Also, in cases where the thickness of the optical pickup 3 does not matter, the laser beam emitted from the laser beam generator 33 may be directed toward the optical disc 1 without using the total reflection mirror 37. Thus, the present invention can also be applied to optical pickups structured differently from the structure shown in FIG. 2.

Next, generation of the FE signal in the AFE circuit 4 will be described.

Figure 3:
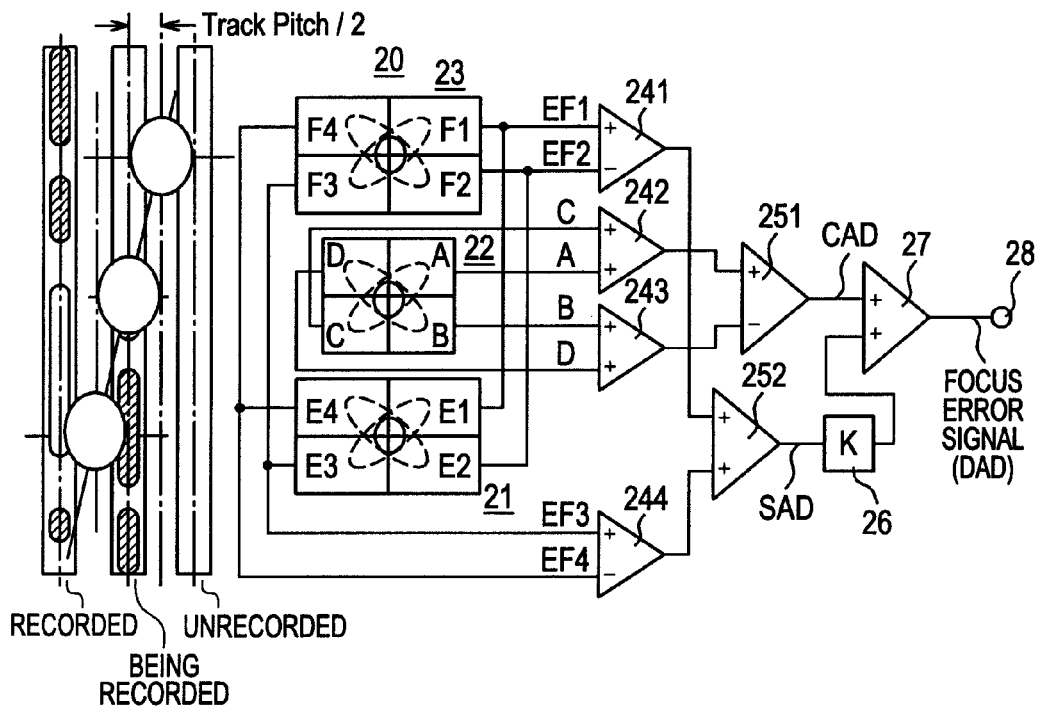
FIG. 3 is a block diagram of a focus error signal generation section of the photodetector shown in FIG. 2.

FIG. 3 is a block diagram of a FE signal generation section of the photodetector 20 shown in FIG. 2. In a left-side portion of FIG. 3, the positional relationship between the spots on an optical disc irradiated with the three diffracted beams (zeroth-order diffracted beam and positive and negative first-order diffracted beams) and recording tracks on the optical disc is conceptually shown. It is assumed that the optical disc 1 is of a type which allows information signal recording. The positional relationship shown represents a transitional state where tracking control and focus control is performed with recording in progress on the optical disc 1.

As described in the foregoing, the optical pickup 3 includes the photodetector 20 for receiving the laser beams reflected from the optical disc 1. The photodetector 20 receives the light reflected from a range of approximately ±Tr relative to a track center position, where Tr represents the recording track pitch of the optical disc 1. The photodetector 20 has three light receiving elements spaced, corresponding to the three diffracted beams, apart by Tr/2 in the tracking direction. Each of the three light receiving elements has four light receiving areas. The AFE circuit 4 generates the FE signal by processing electrical signals obtained based on the laser beams received by the four light receiving areas of each of the three light receiving elements.

Referring to FIG. 3, four electrical signals generated based on the laser beam deriving from the zeroth-order diffracted beam and received by four light receiving areas denoted A, B, C, and D of a first light receiving element 22 are also denoted A, B, C, and D. A signal generated by computation made using adders 242 and 243 and a subtractor 251 is referred to as a conventional astigmatism detection (CAD) signal.

$$FE(CAD)=(A+C)-(B+D) \qquad (1)$$

A second light receiving element 21 and a third light receiving element 23 are provided on both sides of the light receiving element 22 such that they are centered on positions respectively shifted, in the radial direction (tracking direction) of the optical disc 1, from the light receiving element 22 by ±Tr/2. They also have four light receiving areas each and receive the reflected beams deriving from the positive and negative first-order diffracted beams. A signal generated using subtractors 241 and 244 and an adder 252 is referred to as a subsidiary astigmatism detection (SAD) signal.

$$FE(SAD)=(EF1+EF3)-(EF2+EF4) \qquad (2)$$

In the above equation, EF1, EF2, EF3 and EF4 represent signals obtained by adding E1 and F1, E2 and F2, E3 and F3, and E4 and F4, respectively, where E1 to E4 represent electrical signals generated based on the four light receiving areas of the second light receiving element 21 and F1 to F4 represent electrical signals generated based on the four light receiving areas of the third light receiving element 23.

A differential astigmatism detection (DAD) signal outputted to an output terminal 28 is generated by multiplying the SAD signal by coefficient K at a coefficient multiplier 26 and adding the product thus obtained and the CAD signal.

$$FE(DAD)=FE(CAD)+K*FE(SAD)=\{(A+C)-(B+D)\}+ \\ K*\{(EF1+EF3)-(EF2+EF4)\} \qquad (3)$$

In the DAD method generally used today, focus servo control is performed using the signal obtained by the above equation (3) as a FE signal.

The value of coefficient K applied by the coefficient multiplier 26 is determined beforehand such that tracking error signal leakage into the DAD signal is minimum. Alternatively, an amplitude detector to detect the amplitude of the DAD signal at the output terminal 28 may be provided to appropriately control the value of coefficient K and keep the amplitude of the DAD signal at a minimum value.

In these days, the photodetector 20 is, in many cases, not a mere optical part but it is an optoelectric part including an electrical signal generation unit for generating an electrical signal based on detected light. Such a photodetector is also referred to as an optical electronic integrated circuit (OEIC), i.e. a type of integrated circuit. Hence, the light receiving elements 21, 22 and 23 having divided light receiving areas are formed with extremely high positional accuracy using an integrated circuit fabrication process.

The first light receiving element 22, adders 242 and 243, and subtractor 251 combined may be referred to as a main focus system. The second and third light receiving elements 21 and 23, subtractors 241 and 244, adder 252 and coefficient multiplier 26 combined may be referred to as a sub-focus system.

Next, a problem involved in using a one-plane, two-wavelength diffraction grating as the diffraction grating 34 shown in FIG. 2 and a new improvement method will be described.

Figure 4:
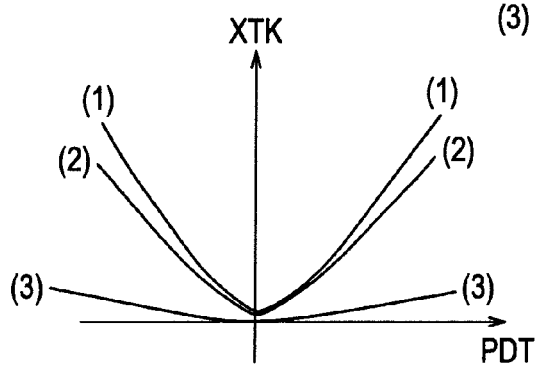
FIG. 4 shows example relationship between the arrangement of light receiving elements in a photodetector and crosstalk amplitude.

FIG. 4 shows example relationship between the arrangement of light receiving elements in a photodetector and crosstalk amplitude for a case where a diffraction grating with an optimum grating period for a laser beam for DVD is used. The horizontal axis represents PDT and the vertical axis represents XTK.

In FIG. 4, PDT represents photodetector (PD) balance of the light receiving elements 21, 22, and 23, shown in FIG. 3, in the lateral direction as seen on FIG. 3 (linear-speed direction of the optical disc 1 relative to the optical pickup 3). In the case of the light receiving element 22, for example, PDT in a state where the corresponding laser beam is optimally focused under focus control is expressed as follows.

$$PDT=\{(D+C)-(A+B)\}/(A+B+C+D) \qquad (4)$$

Namely, the value of PDT for each light receiving element is associated with a state where the corresponding laser beam is optimally focused on the light receiving element forming an approximately true circular image. When the laser beam is not optimally focused, i.e. defocused in any direction, it forms an approximately elliptical image on the light receiving element. Referring to FIG. 3, when PDT is positive, the position of each light receiving element is shifted rightward relative to the incident beam and, when PDT is negative, the position of each light receiving element is shifted leftward relative to the incident beam.

Referring to FIG. 4, XTK (crosstalk noise) represents the amplitude of a TR signal leaking into a FE signal. In FIG. 4, curve (1) represents the amplitude of crosstalk noise in a main signal, i.e. the amplitude of crosstalk noise in the CAD signal expressed by the foregoing equation (1). Similarly, curve (2) represents the amplitude of crosstalk noise in a sub-signal, i.e. the amplitude of crosstalk noise in the SAD signal expressed by the foregoing equation (2). Curve (3) represents the amplitude of crosstalk noise in the DAD signal expressed by the foregoing equation (3).

When analyzing the relationship between PDT and XTK as shown in FIG. 4, it is appropriate to measure XTK while shifting the light receiving elements 21, 22, and 23 laterally, as seen on FIG. 3, by an equal distance. In FIG. 4, the XTK characteristic curves are represented using the position in curve (1) where the crosstalk in the main signal is minimum as a reference position.

The crosstalk noise in the CAD signal and that in the SAD signal are, in principle, opposite to each other in phase, so that adding them together nullifies their amplitudes. Hence, the DAD signal outputted to the output terminal 28 shown in FIG. 3 becomes a focus error signal without much crosstalk from the tracking error signal, so that precise focus control is made possible. As mentioned in the foregoing, the value of coefficient K applied by the coefficient multiplier 26 is preferably determined beforehand such that the amplitude of the DAD signal outputted to the output terminal 28 is minimized. Alternatively, a control section which detects the amplitude of the DAD signal at the output terminal 28 and controls the value of coefficient K so as to minimize the amplitude of the DAD signal may be provided.

The XTK characteristics shown in FIG. 4 are based on a state where, as mentioned in the foregoing, a diffraction grating with an optimum grating period for the corresponding laser beam for DVD is used. The crosstalk can similarly be reduced also in cases where a two-wavelength laser beam generator is used together with a two-plane, two-wavelength diffraction grating unit which optimally diffracts a laser beam, whether for CD or DVD, into a main beam and sub-beams. In such cases, as shown by curve (3) in FIG. 4, TR signal leakage into the FE signal can be reduced substantially in accordance with the principle.

When using a one-plane, two-wavelength diffraction grating, however, it is necessary to devise a further improvement measure.

Figure 5:
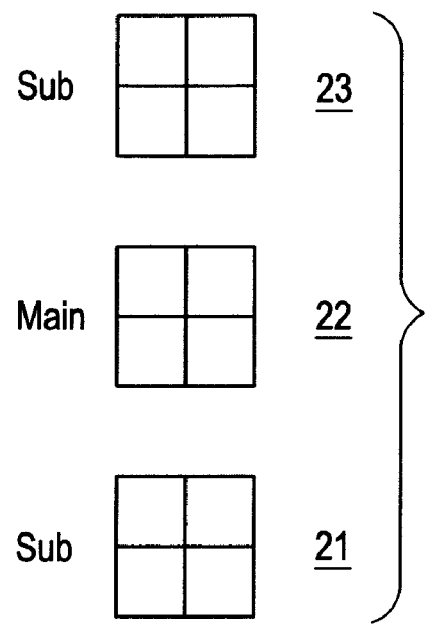
FIG. 5 shows an example arrangement of light receiving elements in a photodetector.

FIG. 5 shows an example arrangement of light receiving elements in a photodetector.

Figure 6:
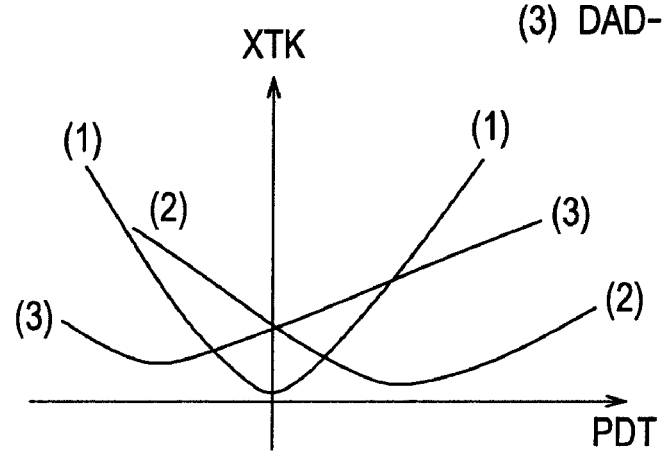
FIG. 6 shows another example of relationship between the arrangement of light receiving elements in a photodetector and crosstalk amplitude.

FIG. 6 shows another example of relationship between the arrangement of light receiving elements in a photodetector and crosstalk amplitude for a case where a one-plane, two-wavelength diffraction grating is used.

In the state shown in FIG. 5, the center positions of the light receiving elements 21, 22, and 23 shown in FIG. 3 are vertically aligned without any lateral shifting between them. Note that FIG. 4 showing the relationship between XTK and PDT is also based on the arrangement as shown in FIG. 5 of the light receiving elements. FIG. 6 showing, like FIG. 4, the relationship between XTK and PDT is based on a case where a one-plane, two-wavelength diffraction grating is used with the light receiving elements arranged as shown in FIG. 5.

In FIG. 6 unlike in FIG. 4, the center where XTK is minimum of curve (1) representing the characteristic of crosstalk noise in the main signal is shifted from that of curve (2) representing the characteristic of crosstalk noise in the sub-signal. Hence, the amplitude of crosstalk noise leaking into the DAD signal represented by curve (3) in FIG. 6 is larger than in FIG. 4 regardless of PDT. This causes focus control to be performed in a state where TR signal leakage into the FE signal is large, so that focus servo performance is degraded.

The characteristic curves shown in FIG. 6 indicate that using a one-plane, two-wavelength diffraction grating does not necessarily result in optimally diffracting laser beams for CD and DVD. In the state as shown in FIG. 6, a position irradiated by a sub-beam of an optical disc is not an optimum position for a main beam.

How the above problem is addressed to according to the present embodiment of the invention will be described below.

Figure 7:
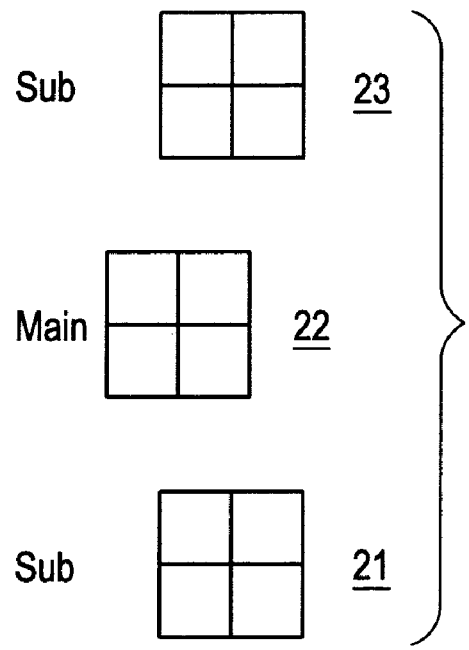
FIG. 7 shows an example arrangement of the light receiving elements in the photodetector according to the present embodiment of the invention.

FIG. 7 shows an example arrangement of the light receiving elements in the photodetector according to the present embodiment of the invention.

Figure 8:
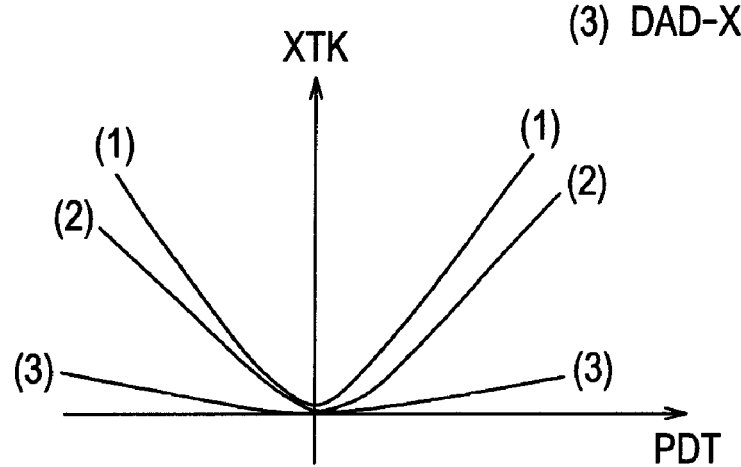
FIG. 8 shows example relationship between the arrangement of the light receiving elements in the photodetector and crosstalk amplitude according to the present embodiment of the invention.

FIG. 8 shows example relationship between the arrangement of the light receiving elements in the photodetector and crosstalk amplitude according to the present embodiment of the invention.

In FIG. 6, curve (2) representing the characteristic of crosstalk noise in the sub-signal is shifted in the positive direction in terms of PDT relative to curve (1) representing the characteristic of crosstalk noise in the main signal. This signifies that the positive and negative first-order diffracted beams (sub-beams) are incident centering on spots rightward, as seen in FIG. 3 or FIG. 5, of the spot on which the zeroth-order diffracted beam (main beam) is incident on the optical disc.

Hence, to remove such shifting between the characteristic curves, the second and third light receiving elements are shifted rightward relative to the first light receiving element 22 in the present embodiment.

The example relationship between XTK and PDT shown in FIG. 8 has been measured using a one-plane, two-wavelength diffraction grating with the light receiving elements arranged as shown in FIG. 7. In FIG. 8, the center where the XTK value is minimum of curve (2) representing the characteristic of crosstalk noise in the sub-signal approximately coincides with that of curve (1) representing the characteristic of crosstalk noise in the main signal. As shown in FIG. 8, the amplitude of crosstalk noise in the DAD signal shown by curve (3) is reduced to be comparable to that shown in FIG. 4. Hence, focus control is performed in a state where TR signal leakage into the FE signal is small, so that focus servo performance is improved.

The arrangement of the light receiving elements as shown in FIG. 7 in which the second and third light receiving elements 21 and 23 are shifted rightward relative to the first light receiving element 22 is only an example. They may be shifted in a different direction depending on the design of the one-plane, two-wavelength diffraction grating to be used.

The arrangement of the light receiving elements as shown in FIG. 7 may be applied not only to the light receiving elements for DVD but also to the light receiving elements for CD included in an optical pickup having a two-wavelength laser beam generator.

Figure 9:
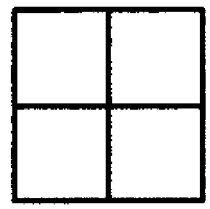
FIG. 9 shows another example arrangement of light receiving elements in a photodetector according to an embodiment of the invention.
Figure 9:
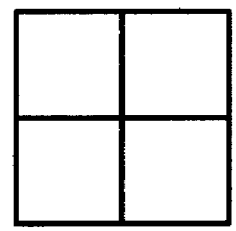
Figure 9:
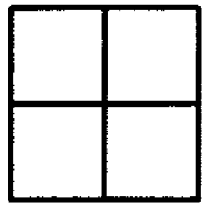
Figure 9:
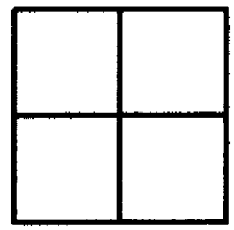
Figure 9:
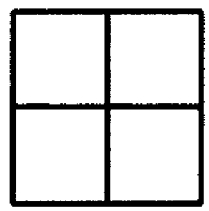
Figure 9:
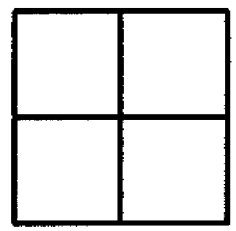

FIG. 9 shows another example arrangement of light receiving elements included in a photodetector according to the present invention. In this example, the light receiving elements 21, 22, and 23 for DVD are closely sided by light receiving elements 21A, 22A, and 23A for CD. The positions relative to one another of the light receiving elements 21, 22, and 23 as well as those of the light receiving elements 21A, 22A, and 23A are determined such that focus control is performed in a state where TR signal leakage into the FE signal is small.

In FIGS. 7 and 9, shifting of the light receiving elements 21 (21A) and 23 (23A) relative to the first light receiving element 22 (22A) is shown exaggerated for easy recognition. Light receiving elements for DVD, for example, are, in many cases, as large as about 100 μm square and the above-described shifting between them measures about 1 μm.

The light receiving elements are, as mentioned in the foregoing, manufactured in a semiconductor manufacturing process. The shifting of about 1 μm between light receiving elements can therefore be controlled without any problem taking tolerance into account.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An optical pickup for recording or reproducing, by irradiating an optical disc recording medium with a laser beam, an information signal on or from the optical disc recording medium, comprising:

a laser beam generator for selectively generating a first laser beam with a first wavelength or a second laser beam with a second wavelength different from the first wavelength;

a one-plane two-wavelength diffraction grating which is irradiated with one of the first and the second laser beams generated by the laser beam generator and divides, using a same diffraction plane, the one of the first and the second laser beams into a main beam and two sub-beams;

a collimating lens for converting the main beam and two sub-beams, each being a divergent beam, generated at the one-plane two-wavelength diffraction grating into parallel beams;

an objective lens for condensing the main beam and two sub-beams converted into parallel beams by the collimating lens on a data recording surface of the recording medium;

a condensing lens for condensing the main beam and two sub-beams reflected from the data recording surface; and a photodetector including a first light receiving element for the first laser beam which has four light receiving areas and converts, by being irradiated with the main beam of the first laser beam condensed by the condensing lens, the main beam of the first laser beam into an electrical signal, a second and a third light receiving elements for the first laser beam each of which has four light receiving areas and converts, by being irradiated with a corresponding one of the two sub-beams of the first laser beam condensed by the condensing lens, the corresponding sub-beam of the first laser beam into an electrical signal, a first light receiving element for the second laser beam which has four light receiving areas and converts, by being irradiated with the main beam of the second laser beam condensed by the condensing lens, the main beam of the second laser beam into an electrical signal, and a second and a third light receiving elements for the second laser beam each of which has four light receiving areas and converts, by being irradiated with a corresponding one of the two sub-beams of the second laser beam condensed by the condensing lens, the corresponding sub-beam of the second laser beam into an electrical signal;

wherein a center position of the four light receiving areas of each of the second and the third light receiving elements for the first laser beam is shifted by a predetermined distance relative to the first light receiving element for the first laser beam, and a center position of the four light receiving areas of each of the second and the third light receiving elements for the second laser beam is shifted by a predetermined distance relative to the first light receiving element for the second laser beam, in a linear-speed direction of the optical disc relative to the optical pickup.

2. The optical pickup according to claim 1, wherein the distance by which each of the second and the third light receiving elements is shifted is determined such that the amount of a TR signal leaking into an FE signal generated based on the main beam and sub-beams is minimum.

3. The optical pickup according to claim 1, further comprising a beam splitter disposed between the diffraction grating and the objective lens, the beam splitter passing a laser beam incident thereon in a first direction and reflecting a laser beam incident thereon in a second direction, wherein the laser beam reflected from the beam splitter is incident on the condensing lens.

* * * * *